(12) United States Patent
Sano et al.

(10) Patent No.: US 11,380,909 B2
(45) Date of Patent: Jul. 5, 2022

(54) METHOD OF MANUFACTURING SEPARATOR

(71) Applicants: NOK CORPORATION, Tokyo (JP); Honda Motor Co., Ltd., Tokyo (JP)

(72) Inventors: Yohei Sano, Kanagawa (JP); Shigeru Watanabe, Kanagawa (JP); Akihito Giga, Saitama (JP); Suguru Ohmori, Saitama (JP)

(73) Assignees: NOK CORPORATION; Honda Motor Co., Ltd.

( * ) Notice: Subject to any disclaimer, the term of this patent is extended or adjusted under 35 U.S.C. 154(b) by 0 days.

(21) Appl. No.: 17/128,547

(22) Filed: Dec. 21, 2020

(65) Prior Publication Data

US 2021/0194019 A1   Jun. 24, 2021

(30) Foreign Application Priority Data

Dec. 23, 2019 (JP) .............................. JP2019-231111

(51) Int. Cl.
*H01M 8/0228* (2016.01)
*H01M 8/10* (2016.01)
*H01M 8/0276* (2016.01)
*H01M 8/0206* (2016.01)

(52) U.S. Cl.
CPC ....... *H01M 8/0228* (2013.01); *H01M 8/0206* (2013.01); *H01M 8/0276* (2013.01); *H01M 8/10* (2013.01)

(58) Field of Classification Search
CPC ............. H01M 8/0228; H01M 8/0206; H01M 8/0276; H01M 8/10; H01M 8/0273; H01M 8/0286; H01M 8/00; Y02E 60/50; Y02P 70/50
See application file for complete search history.

(56) References Cited

U.S. PATENT DOCUMENTS

2018/0123141 A1   5/2018 Xi et al.

FOREIGN PATENT DOCUMENTS

| JP | 2006-504872 A | 2/2006 |
| WO | 2004/036677 A2 | 4/2004 |

*Primary Examiner* — Helen Oi K Conley
(74) *Attorney, Agent, or Firm* — Harness, Dickey & Pierce, P.L.C.

(57) ABSTRACT

A method includes a forming step of forming a first metal separator and a second metal separator each including a protruding sealing bead portion and a protruding stopper bead portion; a joining step of joining surfaces of the first metal separator and the second metal separator on sides opposite to sides on which their respective sealing bead portions protrude, and attaching seal members in an extension direction or on distal ends of the sealing bead portion; and a preload applying step of applying preload to a bead seal section formed of one pair of the sealing bead portions and the seal members and a stopper section formed of one pair of the stopper bead portions in a height direction thereof, thereby plastically deforming the bead seal section and the stopper section simultaneously.

3 Claims, 8 Drawing Sheets

METHOD OF MANUFACTURING SEPARATOR

CROSS REFERENCE TO RELATED APPLICATIONS

This application claims the foreign priority benefit under 35 U.S.C. § 119 of Japanese patent application No. 2019-231111 filed on Dec. 23, 2019, the entire disclosure of which is incorporated herein by reference.

BACKGROUND OF THE INVENTION

1. Field of the Invention

The present invention relates to a method of manufacturing a separator for use in a fuel cell.

2. Description of the Related Art

Figure 7:
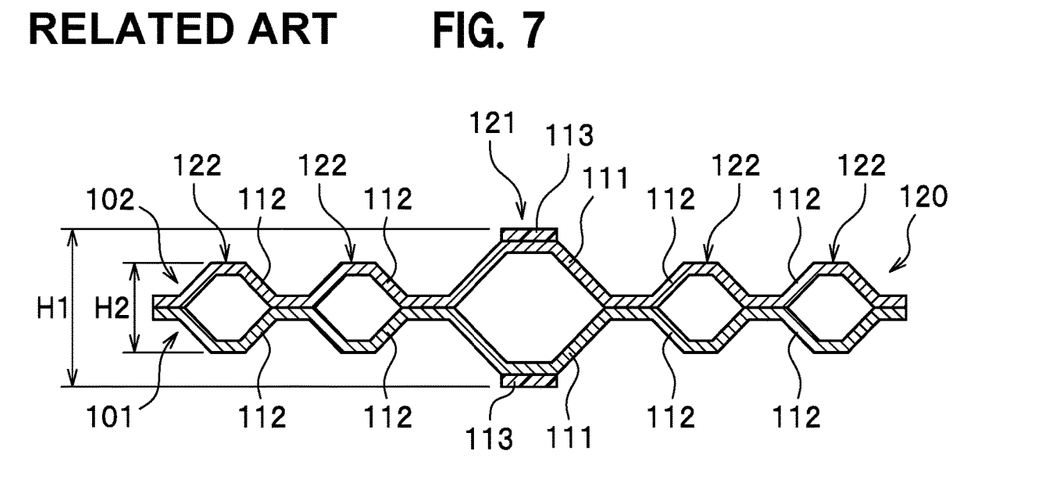
FIG. 7 is a cross-sectional view illustrating a separator according to the related art.

For example, there have been known fuel cells including separators as described in Published Japanese Translation of PCT International Application No. 2006-504872 and United States Patent Application Publication No. 2018/0123141A1. FIG. 7 is a cross-sectional view illustrating a separator according to the related art. As illustrated in FIG. 7, a separator 120 includes a first metal separator 101, a second metal separator 102, and seal members 113 and 113.

Each of the first metal separator 101 and the second metal separator 102 includes a protruding sealing bead portion 111 and protruding stopper bead portions 112 having a protruding height lower than that of the sealing bead portion 111. Surfaces of the first metal separator 101 and the second metal separator 102 on the sides opposite to the sides on which their respective sealing bead portions 111 protrude are joined together. Distal ends of the sealing bead portions 111 are provided with the seal members 113.

In the separator 120, a bead seal section 121 is formed of the sealing bead portions 111 and 111 and the seal members 113 and 113. Then, in the separator 120, each stopper section 122 is formed of the stopper bead portions 112 and 112. The bead seal sections 121 and 121 facing each other hold and seal an electrolyte membrane in between, and thereby are capable of preventing leakage of reaction gas such as fuel gas and oxidant gas. Further, when an excessive pressing load acts on a fuel cell, the stopper sections 122 receive the load and make the bead seal section 121 less likely to be excessively distorted or bucked.

Figure 8:
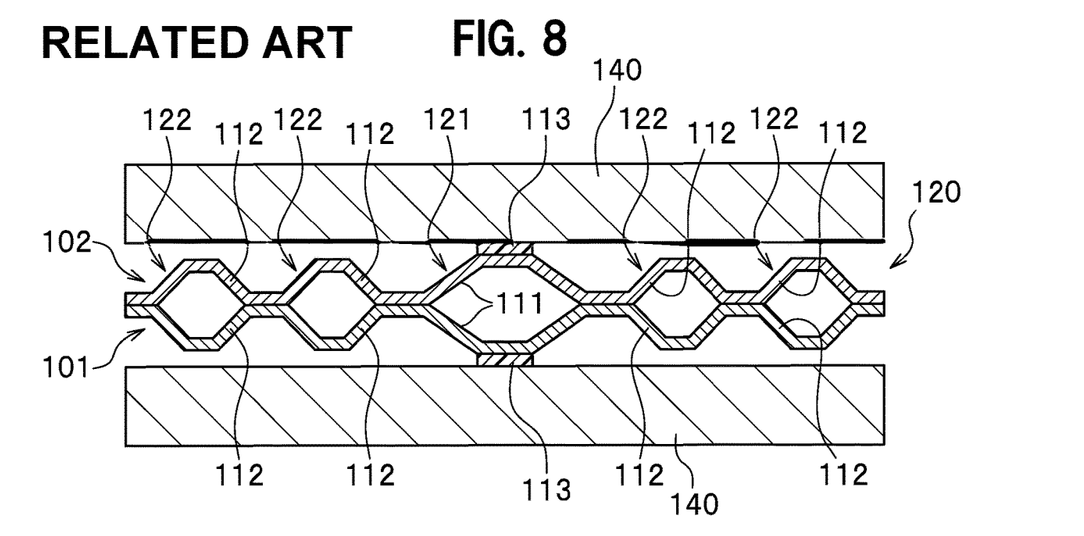
FIG. 8 is a schematic cross-sectional view illustrating a preload applying step in a separator according to the related art.

In general, preload is applied to the separator before the separator is assembled in a fuel cell. FIG. 8 is a schematic diagram illustrating a preload applying step in a separator according to the related art. As illustrated in FIG. 8, in the preload applying step, the preload can be applied to the separator 120 by a pair of plate-shaped platens 140 and 140. If the bead seal section 121 is deformed in advance by the load acting in directions reverse to the protruding directions of the sealing bead portions 111, the bead seal section 121 can achieve stable sealing performance without inducing plastic deformation even when the pressing load acting on the bead seal section 121 varies.

Figure 9:
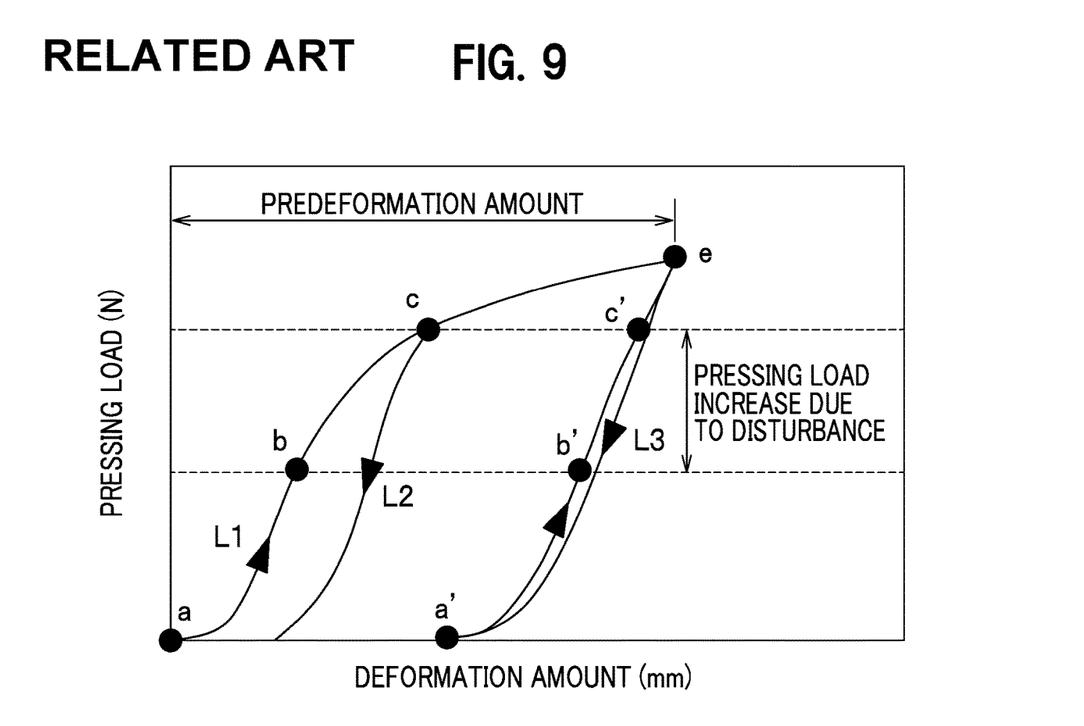
FIG. 9 is a graph presenting a relationship between a deformation amount and a pressing load of a bead seal section and stopper sections in a separator according to the related art.

FIG. 9 is a graph presenting a relationship between a deformation amount and a pressing load of a bead seal section and stopper sections in a separator according to the related art. Here, an operation and effects of the preload are described in detail. As illustrated in FIG. 9, when a pressing load is applied along a load characteristic line L1 to the bead seal section 121 (point a) that has not been deformed in advance, the bead seal section 121 exhibits the sealing performance (point b). In this state, when a pressing load due to a disturbance acts (point c), the bead seal section 121 is plastically deformed and the load characteristic line of the bead seal section 121 moves from L1 to L2. For this reason, the bead seal section 121 has difficulty in maintaining the stable sealing performance.

In contrast to this, after the load characteristic line is moved from L1 to L3 (point e) by applying the preload to the bead seal section 121, the pressing load is once removed (point a') and then the pressing load is applied again to exhibit the sealing performance (point b'). In this case, even when a pressing load due to a disturbance increases to point c', the bead seal section 121 is hardly plastically deformed and is capable of maintaining the characteristics along the load characteristic line L3. For this reason, even when the pressing load acting on the bead seal section 121 varies, the plastic deformation is not induced and the stable sealing performance can be obtained.

Figure 10:
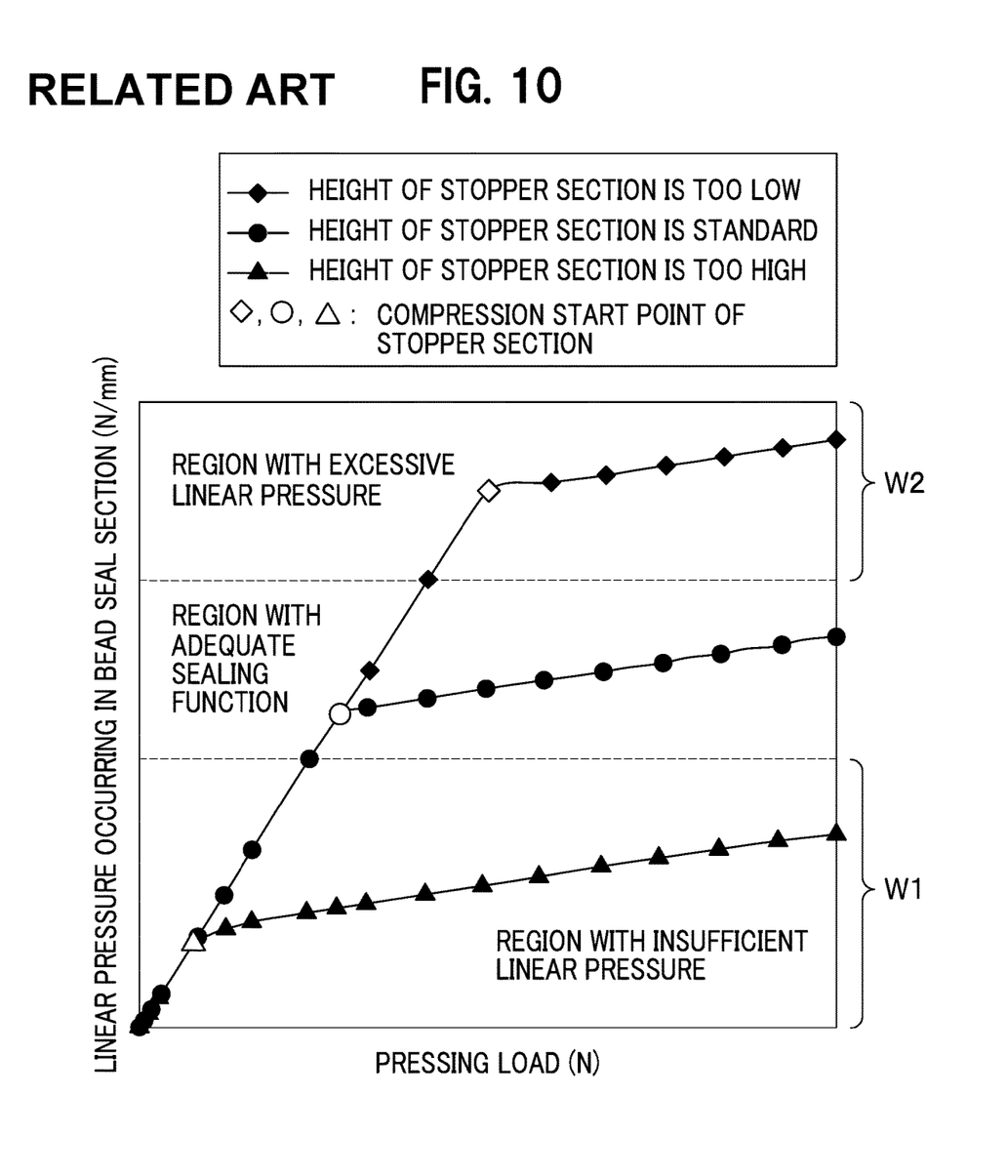
FIG. 10 is a graph presenting a relationship between a pressing load and a linear pressure occurring in a bead seal section in a separator according to the related art.

In such a separator, as a result of press-forming the first metal separator 101 and the second metal separator 102, the height H1 of the bead seal section 121 and the height H2 of the stopper sections 122 (see FIG. 7) may have great dimensional variations due to an influence of processing errors and the like in some cases. FIG. 10 is a graph presenting a relationship between a pressing load and a linear pressure occurring in a bead seal section in a separator according to the related art. For example, when a pressing load acts on a fuel cell in which the height H2 of the stopper sections 122 is too high, the bead seal section 121 may fail to generate a required linear pressure because the stopper sections 122 receive a part of the pressing load (see a region W1).

On the other hand, for example, when an excessive pressing load acts on a fuel cell in which the height dimension of the stopper section 122 is too low due to the dimensional variation, the bead seal section 121 may be abnormally deformed and impair the sealing function (see region W2). For these reasons, the high dimensional accuracy is required for the height of the stopper sections 122 (the stopper bead portions 112).

SUMMARY OF THE INVENTION

The present invention has been made to solve the aforementioned problem, and has an object to provide a method of manufacturing a separator capable of achieving a desired sealing surface pressure without inducing plastic deformation even with a load variation.

The present invention for solving the aforementioned problem provides a method of manufacturing a separator for use in a fuel cell, the method including a forming step of forming a first metal separator and a second metal separator each including a protruding sealing bead portion and a protruding stopper bead portion having a protruding height lower than that of the sealing bead portion; a joining step of joining surfaces of the first metal separator and the second metal separator on sides opposite to sides on which their respective sealing bead portions protrude, and attaching seal members in an extension direction or on distal ends of the sealing bead portion; and a preload applying step of applying preload to a bead seal section formed of one pair of the sealing bead portions and the seal members and a stopper section formed of one pair of the stopper bead portions in a height direction thereof, thereby plastically deforming the bead seal section and the stopper section simultaneously.

According to the above manufacturing method, a dimensional variation of the height of the stopper bead portions can be reduced because the preload is applied to the stopper section. This makes it possible to achieve a desired sealing surface pressure even in the case where a load variation occurs in a fuel cell. In addition, since the preload is applied to both of the sealing bead portions and the stopper bead portions, it is possible to achieve a desired sealing surface pressure without inducing plastic deformation even with a load variation.

According to the method of manufacturing a separator in the present invention, it is possible to achieve a desired sealing surface pressure without inducing plastic deformation even with a load variation.

DETAILED DESCRIPTION OF THE EMBODIMENTS

Figure 1:
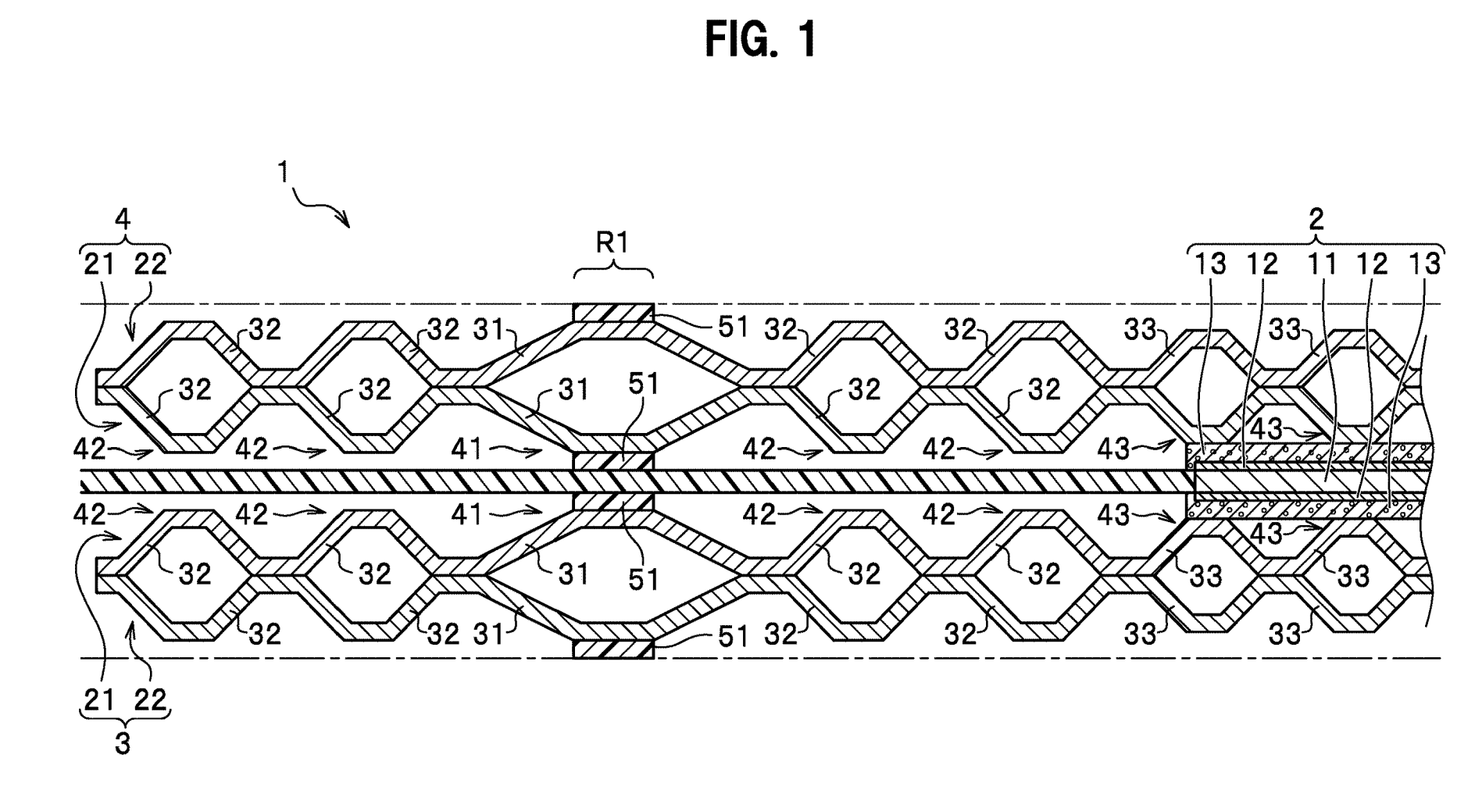
FIG. 1 is a cross-sectional view of a fuel cell according to Example 1.

A method of manufacturing a separator and a separator according to an embodiment as illustrated in FIG. 1 will be described in detail with reference to the accompanying drawings. As illustrated in FIG. 1, a fuel cell 1 includes a membrane electrode assembly 2, and a first separator 3 and a second separator 4 between which the membrane electrode assembly 2 is held.

Each of the first separator 3 and the second separator 4 is a separator assembly including a first metal separator 21, a second metal separator 22, and seal members 51 and 51. Each of the first metal separator 21 and the second metal separator 22 includes a protruding sealing bead portion 31 and protruding stopper bead portions 32 having a protruding height lower than that of the sealing bead portion 31. Surfaces of the first metal separator 21 and the second metal separator 22 on the sides opposite to the sides on which their respective sealing bead portions 31 protrude are joined together.

In the first separator 3 (the same applies to the second separator 4), the sealing bead portions 31 and 31 and the seal members 51 and 51 form the bead seal section 41. In addition, in the first separator 3 (the same applies to the second separator 4), the stopper bead portions 32 and 32 form the stopper sections 42.

In the method of manufacturing a separator according to the present example, preload is applied to both of the bead seal section 41 and the stopper sections 42. This makes it possible to achieve a desired sealing surface pressure without inducing plastic deformation even with a load variation. Hereinafter, Examples are described in detail.

Example 1

The fuel cell 1 is a member that generates power through chemical reaction between hydrogen (fuel gas) supplied from an anode side and oxygen (oxidant gas) supplied from a cathode side. A fuel cell stack is formed by stacking multiple fuel cells 1 and applying a predetermined compressing load to the fuel cells 1 in a stacking direction thereof. FIG. 1 illustrates the fuel cell 1 under the condition where a predetermined compressing load is applied.

The membrane electrode assembly (MEA) 2 includes an electrolyte membrane 11, electrode catalyst layers 12 and 12, and gas diffusion layers 13 and 13. The electrolyte membrane 11 spreads outside the gas diffusion layers 13. Here, a portion of the electrolyte membrane 11 spreading outside the gas diffusion layers 13 may be a resin film (resin flame member) in some cases.

The first separator 3 is a plate-shaped member arranged on one side of the membrane electrode assembly 2 (on the lower side in FIG. 1). The second separator 4 is a plate-shaped member arranged on the other side of the membrane electrode assembly 2 (on the upper side in FIG. 1). Since the first separator 3 and the second separator 4 in the present example have the same structure, the detailed description of the second separator 4 is omitted with the same reference signs as in the first separator 3 assigned to the second separator 4.

The first separator 3 includes a bead seal section 41 forming a seal region R1 and stopper sections 42. The stopper sections 42 are sections that, when a disturbance (such as a temperature change or collision) occurs on a stack, give support to prevent the bead seal section 41 from being deformed excessively beyond a preset maximum compression amount (receive the load due to the disturbance).

The bead seal section 41 protrudes toward the electrolyte membrane 11 (or the resin film) and is formed, for example, in an endless form along the entire outer periphery of the fuel cell 1. In the present example, only one bead seal section 41 is provided, but two or more bead seal sections 41 may be provided. The bead seal section 41 is provided with the seal members 51 in its extension direction or on the distal ends along the extension direction.

The seal member 51 is formed of an elastic material and is a flat gasket having a rectangular cross section in the present example. The seal member 51 is formed by applying a liquid resin material. The thickness of the seal member 51 may be set as appropriate, but may be set to, for example, about 50 to 200 µm. The seal member 51 may be formed of a material having elasticity. For example, ethylene propylene diene rubber (EPDM), silicone rubber (VMQ), fluororubber (FKM), polyisobutylene (PIB), SIFEL (registered trademark: Shin-Etsu Chemical Co., Ltd.), a resin or the like may be used.

Each of the stopper sections 42 protrudes toward the electrolyte membrane 11 and contacts with the electrolyte membrane 11 or faces the electrolyte membrane 11 across a slight space. The stopper section 42 is extended in a linear form or curved form along the extension direction of the bead seal section 41.

The seal region R1 is formed in such a way that the bead seal section 41 of the first separator 3 and the bead seal section 41 of the second separator 4 hold the electrolyte membrane 11 in between. The seal region R1 makes it possible to prevent leakage of reaction gas such as fuel gas and oxidant gas. Since both the facing bead seal sections 41 include the seal members 51, the sealing performance can be enhanced.

In addition, rib portions 33, 33 in the first separator 3 (the same applies to the second separator 4) form reaction surfaces or channel portions 43. The reaction surfaces or channel portions 43 in the first separator 3 and the reaction surfaces or channel portions 43 in the second separator 4 hold the membrane electrode assembly 2 (the gas diffusion layers 13 and 13) in between, thereby forming a reaction region through which the reaction gas flows.

Preload is applied to all of the bead seal sections 41 and the stopper sections 42 in the first separator 3 and the second separator 4. The preload will be described later.

Next, a method of manufacturing a separator according to the present example is described. The method of manufacturing a separator in the present example includes a press forming step (forming step), a bonding step, and a preload applying step.

Figure 2:
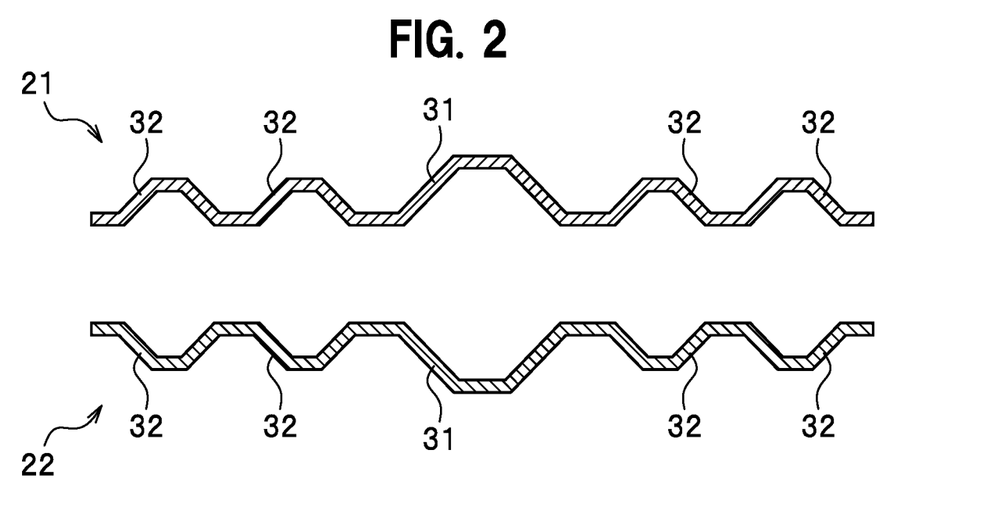
FIG. 2 is a cross-sectional view illustrating a press forming step in a method of manufacturing a separator according to Example 1.

The press forming step is a step of press-forming the first metal separator 21 and the second metal separator 22 as illustrated in FIG. 2. In the press forming step, a flat metal thin plate (material) having a thickness of about 0.03 to 0.5 mm is press-formed to have a corrugated cross section, thereby forming the first metal separator 21 and the second metal separator 22.

The first metal separator 21 includes a sealing bead portion 31 and stopper bead portions 32 (two stopper bead portions 32 on each side of the sealing bead portion 31 in the present example). The sealing bead portion 31 and the stopper bead portions 32 each have a full bead shape having a protruding cross-sectional shape. The protruding height of the stopper bead portions 32 in the plate-thickness direction is lower than that of the sealing bead portion 31. Here, the numbers and layout of the sealing bead portion 31 and the stopper bead portions 32 are just an example, and may be set as appropriate.

Figure 3:
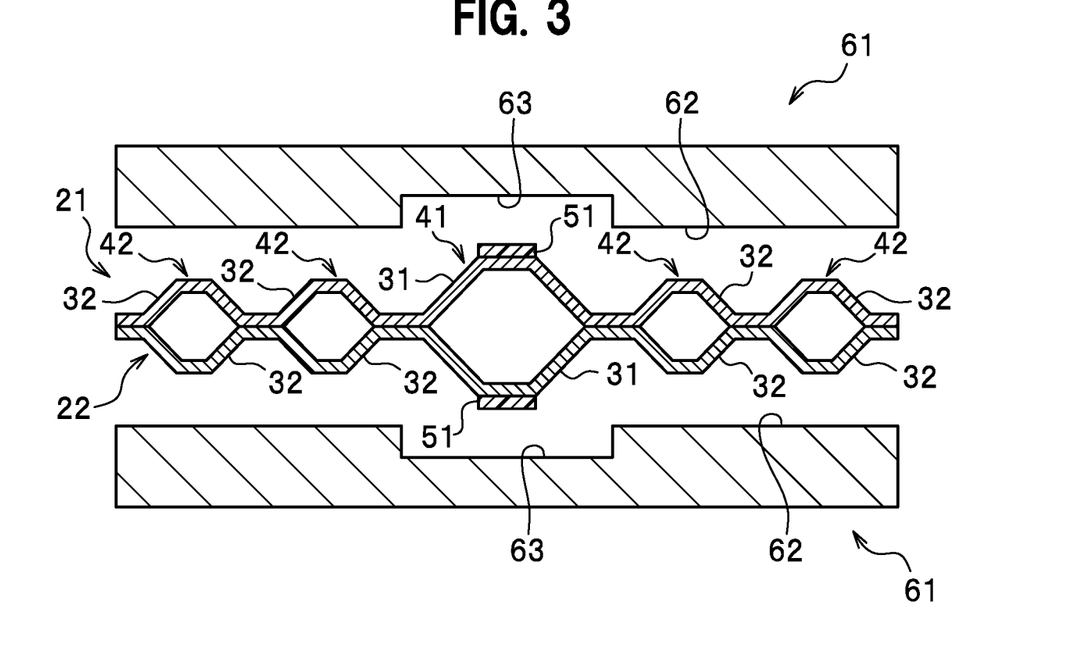
FIG. 3 is a cross-sectional view illustrating a state before load application in a preload applying step in the method of manufacturing a separator according to Example 1.

The joining step is a step of joining the first metal separator 21 and the second metal separator 22 together and attaching the seal members 51. As illustrated in FIG. 3, in the joining step, the surfaces of the first metal separator 21 and the second metal separator 22 on the sides opposite to the sides on which their respective sealing bead portions 31 protrude are joined together. The first metal separator 21 and the second metal separator 22 are united by brazing, swaging, welding, or the like. Moreover, the seal members 51 and 51 are attached in the extension direction or to the distal ends of the sealing bead portions 31 and 31.

Thus, the bead seal section 41 is formed of the sealing bead portions 31 and 31 and the seal members 51 and 51. A hollow cavity is formed in the bead seal section 41. Then, the stopper section 42 is formed of the stopper bead portions 32 and 32. A hollow cavity is formed in the stopper section 42.

Figure 4:
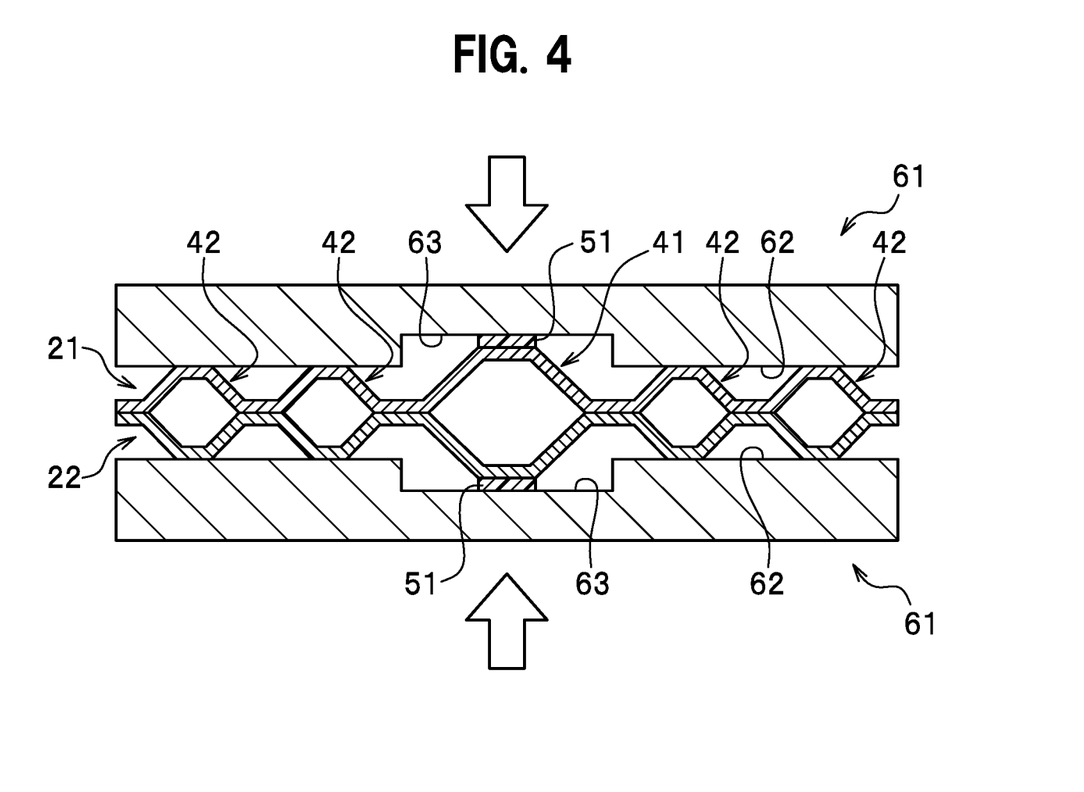
FIG. 4 is a cross-sectional view illustrating a state during load application in the preload applying step in the method of manufacturing a separator according to Example 1.

The preload applying step is a step of applying preload to the first metal separator 21, the second metal separator 22, and the seal members 51 united in the joining step (hereinafter also referred to as the "pressed-joined body") by using platens 61 and 61 as illustrate in FIGS. 3 and 4. The platens 61 are members that apply the preload to the pressed-joined body. The platens 61 are arranged in pair on both sides of the pressed-joined body. Each of the platens 61 is formed of a high-strength metal or resin and has a plate-like shape. The platen 61 includes a pressing surface 62 and a recessed groove portion 63. The pressing surface 62 is a flat surface facing the stopper sections 42 in the pressed-joined body.

The recessed groove portion 63 is a groove provided at a center portion of the pressing surface 62 and having a rectangular cross section. The depth of the recessed groove portion 63 is set as appropriate based on the magnitudes of preload to be applied to the bead seal section 41 and the stopper sections 42. In other words, the magnitudes of the preload to be applied to the bead seal section 41 and the stopper sections 42 can be controlled by adjusting the depth of the recessed groove portion 63. The width of the recessed groove portion 63 is set to such a width that the recessed groove portion 63 and the sealing bead portion 31 may not interfere with each other in an operation of applying the preload.

In the preload applying step, the platens 61 and 61 are brought close to each other from both sides of the pressed-joined body while the bead seal section 41 is placed inside the recessed groove portions 63 of the platens 61. In this process, the load is simultaneously applied to both of the bead seal section 41 and the stopper sections 42 from the platens 61 and 61. The magnitudes of the preload may be set as appropriate, but may be set to, for example, a greatest load that may act on a fuel cell stack in the stack direction during power generation. After the predetermined preload is applied, the platens 61 are pulled apart from the pressed-joined body to release the load. Through the above steps, each of the first separator 3 and the second separator 4 is formed. Here, the method of manufacturing a separator is not limited to the above steps. For example, the order of the steps and the materials may be modified as appropriate.

After the first separator 3 and the second separator 4 are formed, an assembling step and a compressing step are performed to form the fuel cell 1. The assembling step is a step of holding the membrane electrode assembly 2 (the electrolyte membrane 11) between the first separator 3 and the second separator 4 as illustrated in FIG. 1.

The compressing step is a step of forming a fuel cell stack by stacking multiple fuel cells assembled and applying a predetermined compressing load to the fuel cells as illustrated in FIG. 1. When the electrolyte membrane 11 is held between the bead seal sections 41 with a predetermined load, the seal region R1 is formed. The stopper sections 42 and the electrolyte membrane 11 contact with each other or face each other across a slight space.

Figure 5:
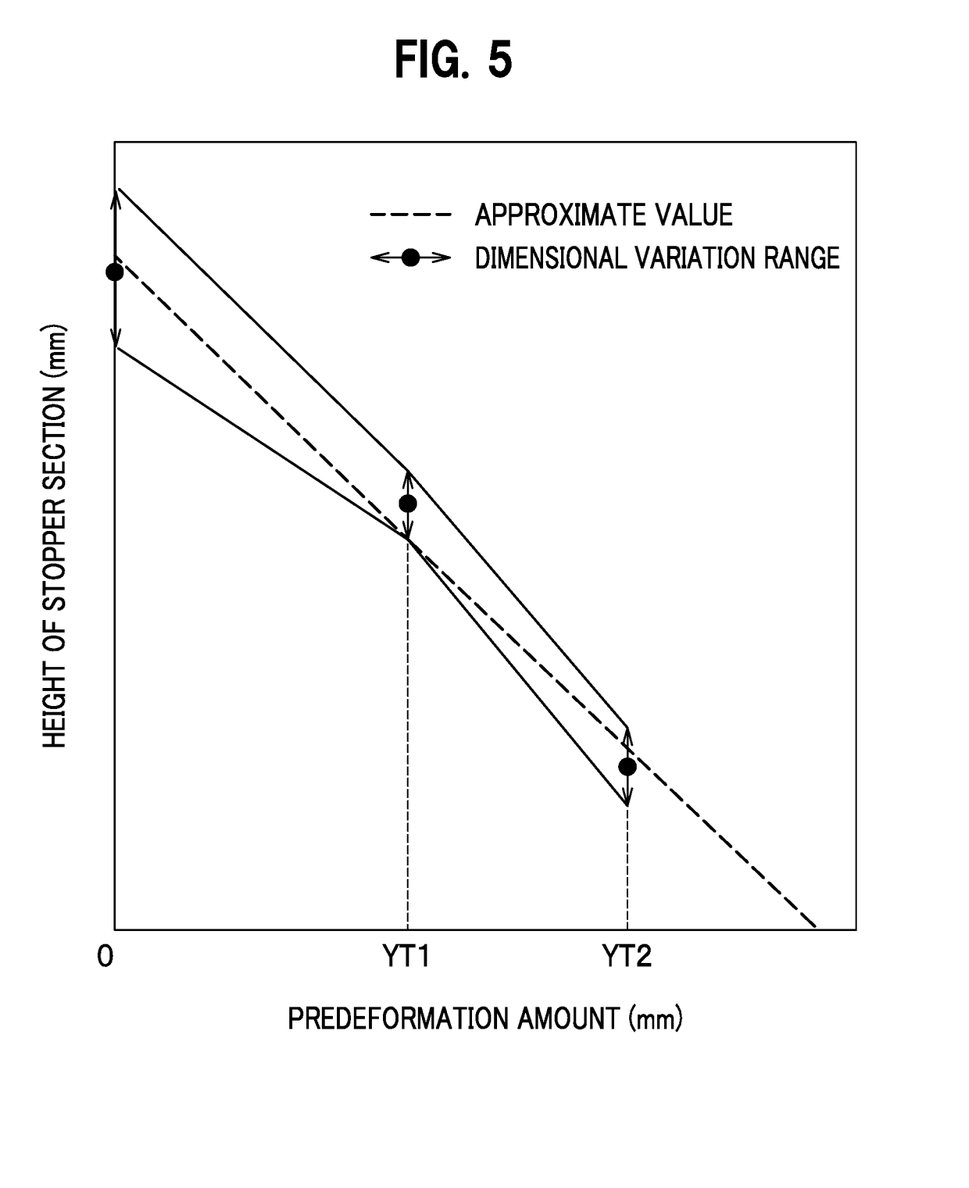
FIG. 5 is a graph presenting a relationship between a predeformation amount and a height of stopper sections in Example 1.

Next, an operation and effects of the present example are described. FIG. 5 is a graph presenting a relationship between a predeformation amount and the height of the stopper sections in Example 1. In FIG. 5, a region between two solid lines indicates a dimensional variation range of the stopper sections 42. As presented in FIG. 5, for example, under the condition where a predeformation amount is zero (no preload is applied), the height variation of the stopper sections 42 is large. Separators formed under the above condition may not achieve the desired sealing performance if a load variation occurs as described above.

On the other hand, as a result of measuring the height dimension of the first separator 3 (the second separator 4) after the preload applying step of the present example, the height variation of the stopper sections 42 was reduced in the case where the predeformation amount was in a range of YT1 to YT2, as presented in FIG. 5. In the case where the preload is also applied to the stopper sections 42 (the stopper bead portions 32) in addition to the bead seal section 41, the dimensional accuracy of the stopper sections 42 can be enhanced, so that it is possible to prevent a deterioration of the sealing function due to a dimensional variation of the stopper sections 42.

In addition, when a disturbance (such as a temperature change or collision) occurs on a stack, the stopper sections 42 and 42 facing each other can give support to prevent the bead seal section 41 from being deformed excessively beyond a preset maximum compression amount. This enables the bead seal section 41 to offer a stable linear pressure and thereby achieve a desired sealing surface pressure stably.

Moreover, by use of the platens 61 and 61 having the recessed groove portions 63, the preload can be easily applied to both of the bead seal section 41 and the stopper sections 42. Then, by adjusting the depth of the recessed groove portion 63, the load to act on the stopper sections 42 can be easily controlled irrespective of the preload to be applied to the bead seal section 41. In other words, the load to act on each of the bead seal section 41 and the stopper sections 42 (the predeformation amount) can be changed by adjusting the depth of the recessed groove portion 63. Specifically, a portion for the recessed groove portion 63 is formed in a nested structure, and the depth of the recessed groove portion 63 is adjusted by inserting a shim between the mother die for the platen 61 and the nested portion. Instead, multiple platens 61 including recessed groove portions 63 having different depths may be prepared and be exchanged as appropriate for the adjustment.

In the preload applying step, the preload can be simultaneously applied to both of the bead seal section 41 and the stopper sections 42, and therefore steps (differences in height dimension) between the bead seal section 41 and the stopper sections 42 can be equalized.

For example, in the case where fuel cells in which no preload has been applied to the bead seal sections 41 are assembled in a fuel cell stack and used, plastic deformation of the bead seal sections 41 is likely to be induced due to a load variation during operation. Accordingly, the bead seal section 41 is on a load characteristic line before plastic deformation when no load is applied, but moves to a load characteristic line different from the load characteristic line before plastic deformation when a load is applied. This narrows an operation range for maintaining the desired sealing surface pressure and makes it difficult to obtain a wide operation range in which the separator can withstand a disturbance (such as a temperature change or collision).

In contrast to this, in the present example, with application of the preload, both of the bead seal section 41 and the stopper sections 42 are plastically deformed in advance. For this reason, the bead seal section 41 and the stopper sections 42 are not plastically deformed due to a load variation during operation of a fuel cell stack, and can move on the same load characteristic line in both cases with load application and load removal. Accordingly, it is possible to widen the operation range, obtain wide load characteristics in which the separator can withstand a disturbance (such as a temperature change or collision), and therefore surely achieve a desired sealing surface pressure.

Moreover, since the preload is applied after the first metal separator 21 and the second metal separator 22 are joined together, deformation of the first metal separator 21 and the second metal separator 22 during the joining process can be corrected.

As described above, according to the present example, the preload is applied to both of the bead seal sections 41 (the sealing bead portions 31 and the seal members 51) and the stopper sections 42 (the stopper bead portions 32) of the first separator 3 and the second separator 4, so that the sealing performance can be synergistically improved without inducing plastic deformation even with a variation of the pressing load.

Example 2

Next, a method of manufacturing a separator according to Example 2 is described. The present example is described mainly for portions different from those in Example 1. As illustrate in FIG. 6, Example 2 is different from Example 1 in that platens 61A and spacers 71 are used.

Figure 6:
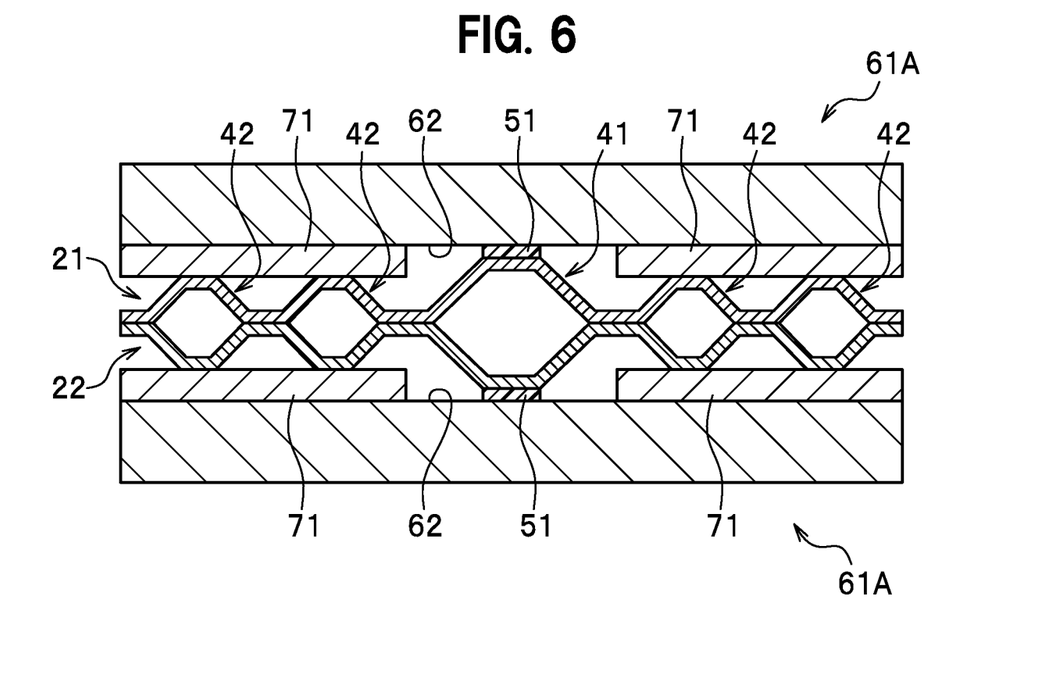
FIG. 6 is a cross-sectional view illustrating a preload applying step in a method of manufacturing a separator according to Example 2.

In a preload applying step in Example 2, the platens 61A and four spacers 71 are prepared. The pressing surface 62 of each of the platens 61A is flat (having no recessed groove portion). The spacers 71 and 71 are fixed to the platen 61A and one spacer 71 is arranged on each of both sides of a center portion of the platen 61A.

In the preload applying step in Example 2, the seal members 51 and 51 of the bead seal section 41 are placed in contact with the pressing surfaces 62 and 62 and both ends of the stopper sections 42 are placed in contact with the spacers 71 and 71. In this state, the platens 61A and 61A are brought close to each other to apply the preload to the bead seal section 41 and the stopper sections 42.

Example 2 described above can also produce substantially the same effects as in Example 1. In addition, in Example 2, the load to act on the bead seal section 41 and the stopper sections 42 can be easily controlled by adjusting the thickness dimension of the spacers 71.

The embodiment and Examples have been described above, but may be modified in design as appropriate. For example, the aforementioned stopper sections 42 are arranged on both sides of the electrolyte membrane 11, but may be arranged on only one of the sides.

What is claimed is:

1. A method of manufacturing a separator for used in a fuel cell, comprising:
   a forming step of forming a first metal separator and a second metal separator each including a protruding sealing bead portion and a protruding stopper bead portion having a protruding height lower than that of the sealing bead portion;
   a joining step of joining surfaces of the first metal separator and the second metal separator on sides opposite to sides on which their respective sealing bead portions protrude, and attaching seal members in an extension direction or on distal ends of the sealing bead portion; and
   a preload applying step of applying preload to a bead seal section formed of one pair of the sealing bead portions and the seal members and a stopper section formed of one pair of the stopper bead portions in a height direction thereof, thereby plastically deforming the bead seal section and the stopper section simultaneously.

2. The method of manufacturing a separator according to claim 1, wherein
in the preload applying step, the preload is applied by using one pair of platens each having a pressing surface and a recessed groove portion which is provided on the pressing surface and in which to place the bead seal section, and by holding the bead seal section between the recessed groove portions facing each other and holding the stopper section between the pressing surfaces facing each other.

3. The method of manufacturing a separator according to claim 1, wherein
in the preload applying step, the preload is applied by using one pair of platens each having a pressing surface and one pair of spacers, and by holding the bead seal section between the pressing surfaces facing each other and holding the stopper section between the spacers facing each other.

\* \* \* \* \*